United States Patent Office 3,147,177
Patented Sept. 1, 1964

3,147,177
LOW-DENSITY, HEAT-INSULATING MATERIAL
William G. Owens, Lititz, and Charles Haines, Jr., Manheim Township, Lancaster County, Pa., assignors to Armstrong Cork Company, Lancaster, Pa., a corporation of Pennsylvania
No Drawing. Filed Apr. 16, 1962, Ser. No. 187,965
5 Claims. (Cl. 161—161)

This invention relates generally to a low-density, heat-insulating product. More particularly the invention relates to a cellular low-density cement product. Still more particularly, the invention relates to a strong, light, cellular product having excellent heat insulation properties. The invention also relates to a structural product having a porous, cellular core and tough, strong external skins firmly affixed to the core.

In the manufacture of walls, partitions, sheets, and other building and structural materials, there has always been a need for a strong heat insulating material. In particular, there has been a need for an adaptable structural material which can be adjusted to meet the needs of various construction situations. For example, it would be highly desirable to present a structural material having hard, tough, and strong exterior surfaces whose thicknesses can be adjusted to meet any particular requirements of strength and fire resistance and other structural requirements, the exterior surfaces enclosing a cellular, nonflammable, light, strong interior whose density may also be adjusted to the requirements of a particular use.

It is the primary object of the present invention to supply such a product. It is another object of the present invention to supply a method of making a low-density, heat-insulating product. It is still a further object of the present invention to present a structural material suitable for such uses as curtain walls and the like, the structural material comprising tough, strong exterior surfaces surrounding a cellular or foamed inner core.

These objects are achieved in a surprisingly effective and straightforward manner. The method of the present invention comprises blending a mixture of expanded perlite, asbestos, Portland cement, water, and a blowing agent. The blowing agent used is adapted to cause the release or generation of a gas in the mixture at relatively low temperatures, in the range of 40°–150° F. The resulting expandable mixture is placed in a mold. The mixture is retained in the mold during expansion of the mixture to fill the mold; the mixture assumes the shape of the mold interior. The molded product is maintained in the mold cavity for at least sufficient time for the foaming reaction to subside and for the mixture to set. The molded product may then be cured in any convenient manner.

Perlite is a form of naturally occurring obsidian or vitreous rock. It is a volcanic cinder product which usually contains 65–75% $SiO_2$, 10–20% $Al_2O_3$, 2–5% $A_2O$, and smaller amounts of potassium oxide, sodium oxide, calcium oxide, magnesium oxide, with possibly some iron oxide (ferric) also being present. When perlite is heated to the softening point, in the range of 800°–2000° F., it expands to form a light, fluffy material similar to pumice. Perlite in the unexpanded state may run 70–90 pounds per cubic foot, whereas in the expanded state, it may run 3–40 pounds per cubic foot. The expanded perlite may be ground or otherwise crushed or abraded to produce particles of a desired size, although expansion of perlite from certain deposits by means of heat may itself produce a large proportion of fines. For purposes of the present invention, it is preferred that the finer particle sizes be used, generally on the order of 200 mesh, U.S. standard, and finer. Such preferred particles have a bulk density on the order of 2–12 pounds per cubic foot, more preferably 3–6 pounds per cubic foot.

In addition to the expanded perlite, the composition of the present invention, particularly when used as a core, must also contain asbestos fibers. These fibers are needed to maintain the integrity of the cellular structure of the composition after generation of the gas by the blowing agent, to be described below. Chrysotile asbestos is preferred, primarily for reasons of economy and availability. The lengths of the fibers are not critical and may range from the short 7D fibers to the long spinning grade fibers. Again the question of economics may control. Use of longer fibers allows use of higher percentages of asbestos fibers since the longer fibers produce a foamed product having greater structural strength for a given degree of foaming. Hence variation of the amount of asbestos fibers used will give some degree of control over the strength of the foamed and cellular structure.

The third principal ingredient of the foamed material is Portland cement. Portland cement is the well-known powdered mixture formed by incipient fusion of a mixture of clay and limestone, followed by grinding the resulting clinker. A small portion of gypsum is usually added prior to or during the final grinding. All of the five main types of Portland cement are usable in the present invention. In view of the foaming reaction, the Portland cement should preferably be one of those cements having a higher alkali content in the range of 0.25%–2% by weight alkali calculated as $Na_2O$. A few Portland cements may contain alkali in an amount lower than that stated, in which case the alkali may be admixed with the cement by the addition of the requisite amount of sodium oxide.

The above-described three ingredients are mixed in suitable proportion. Based on the weight of the mixture of three ingredients, the expanded perlite should be used in an amount of 5–20% by weight, and preferably about 10% by weight, the asbestos should be used in an amount of about 10–70% by weight, and preferably about 45% by weight, and the Portland cement should be used in an amount of about 25–65% by weight, and preferably about 45% by weight. Amounts of any one of these ingredients used below the stated minimum reduces the handleability of the finished product to an extent where it is no longer suitable for the purpose intended. Amounts greater than the stated maximums will also produce a friable material, generally having reduced strength.

The blowing agent to be used in the present composition will be one adapted to generate or release hydrogen from water. Metals above hydrogen in the electromotive series of metals are operable. However, it will be recognized that use of such metals as lithium, sodium, and potassium are not the safest metals to be used in water; the release of hydrogen is sudden and extensive. Therefore, slower acting metals such as magnesium, aluminum, manganese, zinc, chromium, iron, and the others are preferred. A proton donator such as certain of the organic polycarboxylic acids is sometimes desirable, even in the alkaline medium. Examples of such acids are tartaric, citric, and particularly oxalic. Other organic acids of sufficient strength will suffice. The mineral inorganic acids are generally too strong since they allow release of the hydrogen from water too fast in the presence of most of these metals. Use of aluminum powder is preferred since it is readily available as a commercial item and requires no special proton donator to generate hydrogen. The powdered aluminum may be in the form of fine pellets or flakes in a size range of 300 mesh and finer. The powder should have a high specific area. The alkali content described earlier will suffice for the requisite hydrogen production.

The metal powder may be well blended with the other three materials in any convenient and suitable manner. The solids may be blended in indifferent order prior to use and stored, taking care to exclude moisture from the mix. Or the blend may be made on the spot when it is desired to form the foam. The amount of metallic powder to be added will be in the range of 0.5–2% by weight of the total mixture, on a dry basis.

Once water is added and thoroughly mixed with the mixture, foaming will generally start in one or two minutes. Some control can be had over the degree of foaming and over the time for the start of foaming by variation of the water temperature. The water will be added in the range of 40°–150° F., and preferably will be added at about 80° F. in order to start the foaming within a minute or two of water addition and to produce the gas at a reasonable rate. Lower temperatures slow down the gas forming reaction, while higher temperatures enhance it.

Once foaming starts, it is preferred that the mixture be transferred to a mold. The mold may be of any suitable and convenient material such as metal, wood, asbestos-cement, particle board, or other material adapted to confine the expanding material under modest pressures. The mold may be in the form of blocks, sheets, planks, or various shaped smooth or irregular objects. The density of the final product will be largely controlled by adding the requisite amount of material on a weight basis to the mold. Knowing the volume of the mold cavity, and the weight of the material added, the density is readily determined and hence controlled.

The foaming reaction, the generation of hydrogen within the mass of perlite-cement-asbestos mixture, causes the material to swell and fill the mold interior. Gas generation will generally continue for a period of time of several minutes to several hours after the mold cavity has been filled. For this reason it is necessary that the mold be kept closed until the gas generating reaction has ceased, and until the shaped product in the mold has taken a slight set in order that the product may be handled. A good working period of time is 4–5 hours from the time the mold was charged and closed. A wide range of water may be added to the mixture, but the less water within the requisite amount, the better the strength of the product. The amount of water to be added may be stated in terms of the amount of Portland cement in the mixture. On this basis, 1.5 to 9 parts by weight of water to each part by weight of cement will yield a good product. Preferably about 6 parts by weight of water for every 1 part by weight of cement will be used.

A preferred embodiment of this invention involves causing the foaming reaction to take place in a mold in which are positioned two sheets of a cement-containing product, these sheets to serve as the outer skins of the finished product. Thus the finished product will comprise a foamed and cellular core with tough, strong and dense outer skins. The outer skins may be made of a straight mortar of Portland cement and sand made in the form of sheets generally of a thickness of ⅛" to 1". Alternatively, the outer skins may be sheets of asbestos-cement of the usual and well-known formulations. Where asbestos is present in the outer skin, as well as in the core, the fire resistance of the final product is improved and the tensile strength is increased. The sheets will preferably have the above-mentioned thickness of ⅛" to 1". If an object of curved or irregular shape is desired, the sheets to serve as the skin may first be cast in sheet form to conform to the desired shape. Alternatively, the outer skins may be the flexible asbestos-cement products described in copending application Serial No. 69,543, filed November 16, 1960, now U.S. Patent No. 3,058,872, by David A. Feigley, Jr. and William M. Hawkins. These flexible sheets, either singly or in the form of laminates, may readily be bent, twisted, and otherwise conformed to the desired shape of the exterior of the finished product of the present invention.

In making the core material, sand may be used as a partial replacement for the cement where the higher amounts of cement are used, generally more than about 50% by weight cement. Sand is not generally a desirable ingredient in this product since it retards the foaming action.

When the exterior skins are used, their density will normally be that of cement or asbestos-cement products of 100–140 pounds per cubic foot. The actual thickness of the skin may thus be adjusted to supply the needed strength while at the same time contributing no more to the ultimate density of the finished product than is necessary or desirable.

To make a product having two opposing skins, the core material in the mold will be placed on the cement-containing sheet on the bottom of the mold and will foam up inside the mold to press against the cement-containing sheet at the top of the mold. If these sheets have been previously cured, it is preferred that they be thoroughly wetted with water in order that the foam material will rigidly bond to the skin during subsequent cure. Where uncured cement-containing skin materials are used, such as the flexible asbestos-cement sheets mentioned earlier, no particular precautions need be made. It is one of the surprising advantages of the present invention that the bond which forms between the foaming material and the cement-containing skin is tough and strong in the absence of any adhesive, and is in fact stronger than the cohesion of the core material with itself.

When the foaming reaction in the core material has run its course, and when the core material has taken on a set so that it can be handled, the uncured product is removed from the mold, if desired, and cured. Although final cure can certainly be carried out inside the mold, such is unnecessary and generally not desirable since it ties the mold up during the entire period of final cure. The final product, including the cement-containing skins if any, can cure at room temperature in which case the usual 28 days for cement cure or asbestos-cement cure will be needed. In the interest of time, it is preferred to autoclave the final product at elevated pressures and temperatures. Steam is used in the autocalve and temperatures in the range of 250°–400° F., preferably about 325° F., will be used. Steam pressure will generally be that required to produce the curing temperature. Saturated steam will be used. For a product several inches thick, a temperature of 325° F. and a pressure of saturated steam of 90 pounds per square inch gauge will completely cure the product in 20 hours.

For the best all-around use, particularly as heat-insulating walls and partitions, it is preferred that the core material when cured has a density of 10–15 pounds per cubic foot. On such a product the outer skins are preferably of asbestos-cement and may advantageously be of about ⅛" in thickness. The core material itself will vary between 1" and 2" in thickness. Such structural products have excellent properties of heat insulation, fire resistance, compressive and tensile strength, and resistance to damage from knocks and blows. They may be readily prepared in 4' x 8' panels and held in place with bolts, clamps, or other known means. The maximum over-all density of the product of the present invention having skins on the exterior will be about 25 pounds per cubic foot.

It must be pointed out that the product of the present invention is properly termed "cellular" from two different viewpoints. First of all, the product contains expanded perlite which itself is a cellular product. Additionally, the product has been foamed so that it is a foamed or cellular product of itself completely aside from the fact that it contains cellular particles. Some of the cells are incorporated as such in the expanded perlite, and some of the cells are formed by the generation of the gas by the blowing agent.

The following examples illustrate several embodiments of the invention. All parts are by weight unless otherwise stated.

*Example 1*

The following ingredients were well-blended in a Read Co. mixer:

| Ingredients: | Parts |
|---|---|
| Perlite, expanded, 3–8 pounds per cubic foot | 40 |
| Asbestos, equal mixture of 6D and 7K, chrysotile | 180 |
| Portland cement | 180 |
| Aluminum powder | 6 |

The alkali content of the Portland cement used above was 0.7%.

To the well-blended mixture was added 1200 parts of water and mixing was continued for 1 minute. The wet mixture was then transferred by bucket to a mold, the bottom of which was covered with an asbestos-cement sheet. The wet mixture was beginning to foam, and the 1600 parts of it was placed in the mold.

Another asbestos-cement sheet was placed at the top of the mold and the top plate was placed in position to hold the top sheet in place. The material remained in the mold for 15 minutes, at the end of which time the foaming reaction had substantially ceased and the core material had taken on sufficient set to be handled on a caul plate.

The product was removed from the mold, aged for 27 hours at room temperature, and placed in an autoclave maintained at 325° F. by means of 90 pounds per square inch gauge of steam. After 20 hours, the steam was turned off, the clave was vented, and the product removed and cooled.

The product was tough, strong, and light. Its density was 20 pounds per cubic foot, including both skins and core.

The asbestos-cement skins used in this run were made by blending 100 parts chrysotile asbestos, 182 parts Portland cement, and 118 parts of sand (120 mesh). Enough water was added to form a good workable consistency, 41 parts being required.

The asbestos-cement was spread out to form a sheet ³⁄₃₂" in a cold, hydraulic press and maintained under 230,000 pounds of pressure for 2 minutes. It was then allowed to stand for 24 hours under a wet cloth before being used as skins for the described low-density cement product.

*Example 2*

The following ingredients were dry blended for several minutes:

| Ingredients: | Parts |
|---|---|
| Portland cement | 200 |
| Perlite | 80 |
| Asbestos 4T | 40 |
| Asbestos 7K | 80 |

To the above mixture was added 6 parts aluminum powder. After thorough mixing, 1600 parts of water was added followed by mixing for 45 seconds. The mixture was placed in a mold and allowed to foam and fill the mold. The product was removed from the mold, aged for about 24 hours at room temperature, and cured in an autoclave at 325° F. for 20 hours.

The resulting board-like product weighed approximately 12 pounds per cubic foot and was an excellent heat insulator.

*Example 3*

A blend of 20 parts perlite, 220 parts Portland cement, 160 parts 5D asbestos, and 4 parts aluminum powder was thoroughly intermixed.

To 1400 parts of water was added 4 parts sodium hydroxide, and the alkaline solution was blended with the dry mixture for about 45 seconds. The mixture was placed in a mold during foaming and formed into a product which, after curing in the usual manner, constituted an excellent heat-insulating product.

*Example 4*

A sheet suitable for use as an outer skin was prepared by blending 135 parts Portland cement, 90 parts silica (finely ground quartz), 45 parts asbestos 4T, 30 parts asbestos 7K, and 600 parts water. The mixture was compressed to a thickness of ³⁄₃₂" and allowed to set.

A foamable mixture was prepared by blending 180 parts Portland cement, 40 parts perlite, 80 parts asbestos 7K, 100 parts asbestos 6D, and 6 parts aluminum powder. After thorough mixing, 1200 parts water was added, the mixture was blended for 45 seconds, and poured into a mold for foaming. The mold was closed by placing across the opening a sheet to serve as an outer skin prepared as described immediately above. After 15 minutes the foaming had substantially ended and the product was carefully removed from the mold. After aging for about 24 hours the single-skinned product was cured in an autoclave in the usual manner. The resulting product represented an excellent fire-proof acoustical ceiling tile having an N.R.C. of .50–.53 and a thermal conductivity ($k_{70}$) at approximately 12 pounds per cubic foot of .48–.49.

We claim:

1. A low-density, heat-insulating product having an over-all density in the range of 10–25 pounds per cubic foot comprising two dense, cement-containing skins on the outer surfaces thereof and a core of a mixture of 5–20% by weight expanded perlite, 10–70% by weight asbestos, and 25–65% by weight Portland cement, said core containing gas-formed cells in addition to the cells contained in the particles of expanded perlite.

2. A cured, low-density, heat-insulating product consisting essentially of a cellular core and at least two noncellular dense exterior surfaces, the core comprising 5–20% by weight expanded perlite, 10–70% by weight asbestos, 25–65% by weight Portland cement, and containing gas-formed pores in addition to the pores contained in the expanded perlite, the skin consisting essentially of asbestos-cement, the over-all density of the product being in the range of 10–25 pounds per cubic foot.

3. The method of making a low-density, heat-insulating product having an over-all density in the range of 10–25 pounds per cubic foot comprising blending a mixture of 5–20% by weight expanded perlite having a bulk density in the range of 2–12 pounds per cubic foot, 10–70% by weight asbestos, 25–65% by weight Portland cement, water, and a blowing agent adapted to cause the release of a gas in said mixture at a temperature in the range of 40°–150° F., placing the resulting expandable mixture in a mold containing two dense, cement-containing sheets to serve as skins for said product, expanding the mixture against the two sheets, retaining the expandable mixture in the mold after the mixture has expanded to fill the mold cavity for at least sufficient time to allow the foaming reaction to subside and the mixture to set, and curing the resulting expanded product.

4. The method according to claim 3 wherein said blowing agent comprises aluminum powder.

5. The method according to claim 3 wherein said water is added at a temperature of about 80° F.

References Cited in the file of this patent

UNITED STATES PATENTS

| 2,079,664 | Seigle | May 11, 1937 |
| 2,585,366 | Bollaert et al. | Feb. 12, 1952 |

FOREIGN PATENTS

| 125,329 | Australia | Sept. 3, 1947 |
| 159,934 | Australia | Nov. 24, 1954 |
| 478,626 | Great Britain | Jan. 21, 1938 |